US009460514B2

(12) United States Patent
Dhome et al.

(10) Patent No.: US 9,460,514 B2
(45) Date of Patent: Oct. 4, 2016

(54) METHOD FOR LOCATING OBJECTS BY RESOLUTION IN THE THREE-DIMENSIONAL SPACE OF THE SCENE

(71) Applicant: COMMISSARIAT A L'ENERGIE ATOMIQUE ET AUX ENERGIES ALTERNATIVES, Paris (FR)

(72) Inventors: Yoann Dhome, Champigny sur Marne (FR); Bertrand Luvison, Chilly-Mazarin (FR); Quoc-cuong Pham, Le Kremlin Bicetre (FR)

(73) Assignee: Commissariat A L'Energie Atomique et aux Energies Alternatives, Paris (FR)

( * ) Notice: Subject to any disclaimer, the term of this patent is extended or adjusted under 35 U.S.C. 154(b) by 205 days.

(21) Appl. No.: 14/352,310

(22) PCT Filed: Oct. 11, 2012

(86) PCT No.: PCT/EP2012/070107
§ 371 (c)(1),
(2) Date: Apr. 16, 2014

(87) PCT Pub. No.: WO2013/057030
PCT Pub. Date: Apr. 25, 2013

(65) Prior Publication Data
US 2014/0307921 A1 Oct. 16, 2014

(30) Foreign Application Priority Data

Oct. 21, 2011 (FR) ...................................... 11 59594

(51) Int. Cl.
*G06T 7/00* (2006.01)
(52) U.S. Cl.
CPC ........... *G06T 7/0046* (2013.01); *G06T 7/0048* (2013.01); *G06T 2207/10021* (2013.01); *G06T 2207/20144* (2013.01); *G06T 2207/30232* (2013.01)

(58) Field of Classification Search
None
See application file for complete search history.

(56) References Cited

U.S. PATENT DOCUMENTS

| 2008/0118106 | A1* | 5/2008 | Kilambi | ................. G06M 11/00 382/103 |
| 2009/0296989 | A1* | 12/2009 | Ramesh | ............ G06K 9/00771 382/103 |
| 2011/0279685 | A1* | 11/2011 | Alahi | ................. G06K 9/00624 348/187 |

FOREIGN PATENT DOCUMENTS

EP 2131328 A2 12/2009

OTHER PUBLICATIONS

Alexandre Alahi, et al., "Sparsity Driven People Localization with a Heterogeneous Network of Cameras", Journal of Mathematical Imaging and Vision, Jan. 27, 2011, pp. 39-58, vol. 41, No. 1-2, Kluwer Academic Publishers, BO, XP019932874.

(Continued)

*Primary Examiner* — Siamak Harandi
*Assistant Examiner* — Pinalben Patel
(74) *Attorney, Agent, or Firm* — Baker & Hostetler LLP

(57) ABSTRACT

In the field of videosurveillance by calibrated cameras and locating objects of interest in images, a method uses, on the one hand, an initial presence map $p_{CP}^1$ modeling positions i in the scene and comprising, for each position i, a value $p_{CP}^1(i)$ representative of the probability that an object is situated at position i considered, each value $p_{CP}^1(i)$ being obtained a location criterion defined in an image space of the image acquisition system and, on the other hand, atoms $A_i$ predetermined for each position i of the presence map $p_{CP}^1$, the atom $A_i$ of a position i comprising, for each position j, a value $A_i(j)$ representative of overlap between projection m'(i) in the image space of a three-dimensional model M'(i) placed at the position i and projection m'(j) in the image space of a three-dimensional model M'(j) placed at position j, each three-dimensional model being representative of an object.

9 Claims, 2 Drawing Sheets

(56) References Cited

OTHER PUBLICATIONS

Alexandre Alahi, et al., "Sparsity-Driven People Localization Algorithm: Evaluation in Crowded Scenes Environments", 2009 Twelfth IEEE International Workshop on Performance Evaluation of Tracking and Surveillance, Dec. 7, 2009, pp. 1-8, IEEE, Piscataway, NJ, USA, XP031619242.

Alexandre Alahi, et al., "Sport Players Detection and Tracking with a Mixed Network of Planar and Omnidirectional Cameras", Third ACM/IEEE International Conference on Distributed Smart Cameras, Aug. 30, 2009, pp. 1-8, IEEE, Piscataway, NJ, USA, XP031548107.

Giovanni Gualdi, et al., "Multi-Stage Sampling with Boosting Cascades for Pedestrian Detection in Images and Video", Proceedings of ECCV, Jun. 2010, pp. 196-209.

* cited by examiner

METHOD FOR LOCATING OBJECTS BY RESOLUTION IN THE THREE-DIMENSIONAL SPACE OF THE SCENE

CROSS-REFERENCE TO RELATED APPLICATIONS

This application is a National Stage of International patent application PCT/EP2012/070107, filed on Oct. 11, 2012, which claims priority to foreign French patent application No. FR 1159594, filed on Oct. 21, 2011, the disclosures of which are incorporated by reference in their entirety.

FIELD OF THE INVENTION

The invention lies in the field of videosurveillance by calibrated cameras. It relates to a method for locating objects of interest in a scene on the basis of images provided by a camera. The objects of interest may notably be people or vehicles.

BACKGROUND

Numerous applications of image processing are aimed at detecting objects of interest in an image or in an image stream acquired by a camera. These applications rely on procedures that can be classed according to two families. The first family of procedures relies on the recognition of shapes. The principle consists in recognizing one or more very specific characteristics of the object sought, for example the contour of a head or the silhouette of a person. The search for these characteristics over the whole scene is a task that is rendered difficult, on the one hand, by geometric deformations due to the optical distortions of the sensors and to the differences of viewpoint of the objects sought and, on the other hand, by occultations between objects sought. By way of example, the silhouette of a person viewed from the front is very different from that of a person viewed from above. The optical distortions are due to the type of camera used. They are particularly pronounced notably for omnidirectional cameras and so-called "fisheye" cameras. Now, shape recognition procedures require training on labellized bases. These bases give examples of people as well as counter-examples as a function of a particular viewpoint and of a given type of camera. Consequently, the configuration of a system for locating objects of interest using a shape recognition procedure is a tricky task, requiring the production of a training base specific to the particular viewpoint of the camera. The second family of procedures for detecting objects in an image is based on a three-dimensional (3D) space optimization criterion. The idea is to maximize, in the image, the overlap between a mask obtained by background subtraction, and the projection of one or more 3D models of the object sought. An example of such a procedure is described in the document Alahi Alexandre, L. Jacques, Y. Boursier and P. Vandergheynst. "Sparsity-driven People Localization Algorithm: Evaluation in Crowded Scenes Environments", IEEE International Workshop on Performance Evaluation of Tracking and Surveillance, Snowbird, Utah, 2009. A fixed grid of 3D positions on the ground as well as a geometric model of a person, in this instance an ellipsoid representing the upper part of the person and a cylinder for the lower part, are considered in this document. Subsequently, an image in which each pixel takes either a first value, for example '0', or a second value, for example '1', as a function of a parameter of the pixel considered, is called a binary mask. According to the procedure of Alahi, for each position of the grid, a binary mask of the projection of the geometric model, called an atom, is computed. Each binary mask takes the value '1' in each pixel corresponding to the projection of the geometric model in the image, and '0' elsewhere. Locating the people in the image then consists in minimizing the difference between the binary mask obtained by background subtraction and a linear combination of atoms, each atom being either present or absent. Stated otherwise, the procedure consists in searching for the set of positions on the grid giving, by projection of a geometric model at each of these positions, the image most resembling the image in which people are sought. One of the main drawbacks of this procedure is its algorithmic complexity. The search for people is carried out in the image space, thus involving the solving of a linear system whose dimension is equal to the number of pixels in the image, multiplied by the number of positions in the grid. In practice, the procedure requires significant computational resources. Even with a sub-sampling of the image, the procedure is not applicable for real-time processing. Furthermore, the procedure exhibits the drawback of relying on the use of a background subtraction binary mask. But such a mask is liable to fuse disjoint groups of people, for example because of shadows, and to fragment normally joint groups, for example because of clothes whose colors are locally close to the colors of the backdrop. Consequently, the effectiveness of the procedure is limited by that of the background subtraction step.

SUMMARY OF THE INVENTION

An aim of the invention is notably to remedy all or some of the aforementioned drawbacks by allowing a processing for locating objects in real time. For this purpose, the subject of the invention is a method for locating objects of interest in a scene observed by an image acquisition system, the objects of interest being located on the basis of an initial presence map $p_{CP}^1$ modeling positions i in the scene and comprising, for each position i, a value $p_{CP}^1(i)$ representative of the probability that an object of interest is situated at the position i considered, each value $p_{CP}^1(i)$ being obtained on the basis of a location criterion defined in an image space of the image acquisition system. The method is characterized in that it comprises an iteration of the following successive steps as long as at least one of the values $p_{CP}^k(i)$ of the presence map $p_{CP}^k$ considered for the current iteration k is greater than a predetermined threshold:

- determining the position $n^k$ in the presence map $p_{CP}^k$ for which the value $p_{CP}^k(n_k)$ is a maximum, an object of interest being considered to be present at said position $n^k$,
- on the basis of atoms $A_j$ predetermined for each position j of the presence map $p_{CP}^k$, the atom $A_j$ of a position j comprising, for each position i, a value $A_j(i)$ representative of the overlap between the projection m'(i) in the image space of a three-dimensional model M'(i) placed at the position i and the projection m'(j) in the image space of a three-dimensional model M'(j) placed at the position j, each three-dimensional model being representative of an object of interest, determining a presence map $p_{CP}^{k+1}$ each value $p_{CP}^{k+1}(j)$ of which is equal to the value $p_{CP}^k(j)$ decreased by a linear combination of the values $A_{n^k}(j)$ of the atoms $A_{n^k}$ corresponding to the positions $n^k$ where objects of interest are considered to be present.

According to a relatively simple embodiment, each value $A_i(j)$ of an atom $A_i$ is determined as being the ratio of the number of common pixels shared by the projections m'(i) and m'(j) to the number of pixels of the projection $m'^{(j)}$.

The step of determining the presence map $p_{CP}^{k+1}$ is for example carried out by a least squares minimization between the probabilities $p_{CP}^{k}(i)$ of the presence map of the current iteration k and a linear combination of the atoms $A_{n^k}$ corresponding to the positions $n^k$ where objects of interest are considered to be present at the current iteration k.

According to a particular embodiment, the initial presence map $p_{CP}^{1}$ is determined by the following steps:

determining a projection image $B_{m(i)}$ for each position i of the initial presence map $p_{CP}^{1}$, each projection image $B_{m(i)}$ having dimensions equal to those of an image of the image acquisition system and corresponding to the projection m(i) in the image space of a three-dimensional model M(i) representative of an object of interest placed at the position i considered, each pixel of the projection image $B_{m(i)}$ taking a first value when it belongs to the projection m(i) and a second value otherwise, determining, by a processing for locating objects carried out on the basis of the image of the image acquisition system, an image of presence of objects having dimensions equal to those of the image of the image acquisition system, each pixel of the image of presence of objects taking a value as a function of its correspondence to an object present in the scene, determining the initial presence map $p_{CP}^{1}$ as a function of the projection images $B_{m(i)}$ and of the image of presence of objects.

According to a first variant embodiment, the processing for locating objects is a background subtraction processing where each pixel of the image of presence of objects takes a first value when it corresponds to an object present in the scene and a second value otherwise.

The step of determining the initial presence map $p_{CP}^{1}$ can then comprise a step consisting in determining each value $p_{CP}^{1}(i)$ as being equal to the ratio of the number of pixels having at one and the same time the first value in the image of presence of objects and the first value in the projection image $B_{m(i)}$ of the position i considered, to the number of pixels having the first value in said projection image $B_{m(i)}$.

According to a second variant embodiment, the processing for locating objects is a background subtraction processing where each pixel of the image of presence of objects takes a value as a function of the probability that it corresponds to an object present in the scene.

The step of determining the initial presence map $p_{CP}^{1}$ can then comprise a step consisting in determining each value $p_{CP}^{1}(i)$ as being equal to the ratio of the sum of the values of the pixels of the image of presence of objects corresponding to the pixels having the first value in the projection image $B_{m(i)}$ of the position i considered, to the number of pixels having the first value in said projection image $B_{m(i)}$.

According to a particular embodiment, the scene is observed by several image acquisition systems, the initial presence map $p_{CP}^{1}$ being determined on the basis of several initial presence maps $p_{CP}^{c}$, each value $p_{CP}^{c}(i)$ of an initial presence map $p_{CP}^{c}$ being obtained on the basis of a location criterion defined in an image space of the image acquisition system considered, each value $p_{CP}^{1}(i)$ being equal to a mean of the set of values $p_{CP}^{c}(i)$ of the position i considered. This particular embodiment makes it possible to enhance the reliability of the values $p_{CP}^{1}(i)$ of the initial presence map $p_{CP}^{1}$, and to cover a larger number of positions according to different viewpoints.

The advantage of the invention is notably that it makes it possible to use any type of location processing to construct the presence map, and not solely a background subtraction processing. It furthermore makes it possible to combine several processings and several viewpoints.

BRIEF DESCRIPTION OF THE DRAWINGS

The invention will be better understood and other advantages will become apparent on reading the description which follows, given in relation to appended drawings in which.

DETAILED DESCRIPTION

Figure 1:
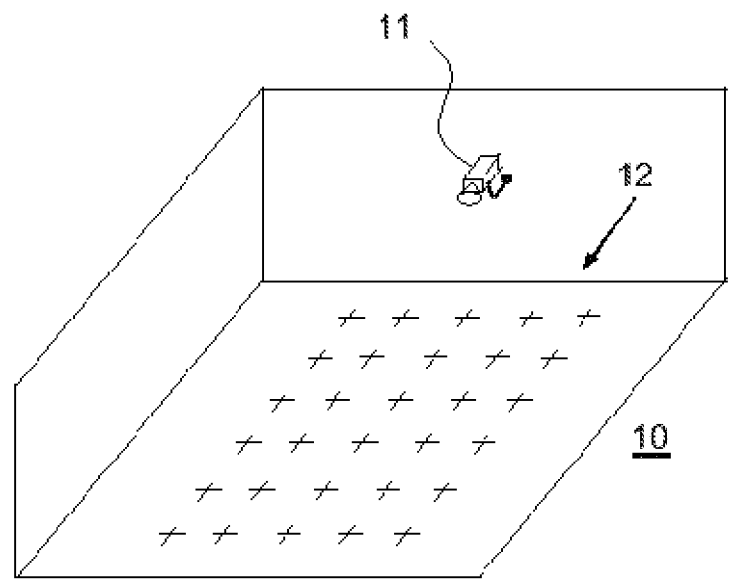
FIG. 1 schematically represents a presence map modeling positions of possible occupancy in a scene for objects that it is sought to locate.

FIG. 1 schematically represents an exemplary scene in which it is sought to locate objects of interest. In FIG. 1, the scene 10 represents a room of a building. The scene can nonetheless be any type of site on which it is desired to search for objects. It may for example be a highway on which it is sought to count a number of vehicles, or a railroad station concourse in which it is sought to locate people. An image acquisition system, such as a video camera 11, is positioned and oriented so as to observe at least one part of the scene. The scene is then observed according to a determined viewpoint. The camera 11 provides digital images on the basis of which the objects of interest are sought. Each image is for example formed by a matrix of pixels each comprising a value representative of the luminous intensity at a point of the scene. The camera 11 is calibrated. Stated otherwise, the relation between the spatial coordinates of each point of the scene and the associated pixel in the image is known.

The method for locating objects of interest according to the invention relies on the use of a probability map of the presence of objects of interest in the scene. This map, called a presence map and denoted $p_{CP}$, comprises a set of positions i defined in the three-dimensional space of the scene and, for each of these positions, a value $p_{CP}(i)$ representative of the probability that an object of interest is situated at the position i considered. The positions of the presence map thus form possible occupancy positions for the objects of interest. The positions are for example disposed so as to form a grid. The presence map 12 is represented in FIG. 1 in the form of a set of crosses each representing a possible occupancy position in the scene for an object of interest. The method for locating objects according to the invention moreover uses three-dimensional models (3D) representative of the occupancy of the objects of interest in the scene. By way of example, it is considered that the objects of interest are people and that the possible occupancy positions correspond to the places where people would have their feet. The presence map 12 can then be called a ground presence map. The positions of the presence map can also, according to the type of objects of interest sought and the geometry of the scene, be situated elsewhere than on plane ground. The 3D model representative of a person is for example an ellipsoid. The presence map 12 can be modeled mathematically in the form of a vector, each component of which is associated with a position i in the scene and whose value $p_{CP}(i)$ defines the probability of presence of an object of interest. The value of the components is for example equal to '0' when it is certain that no person is situated at the position considered, and equal to the value '1' when it is certain that a person is situated there.

Figure 2:
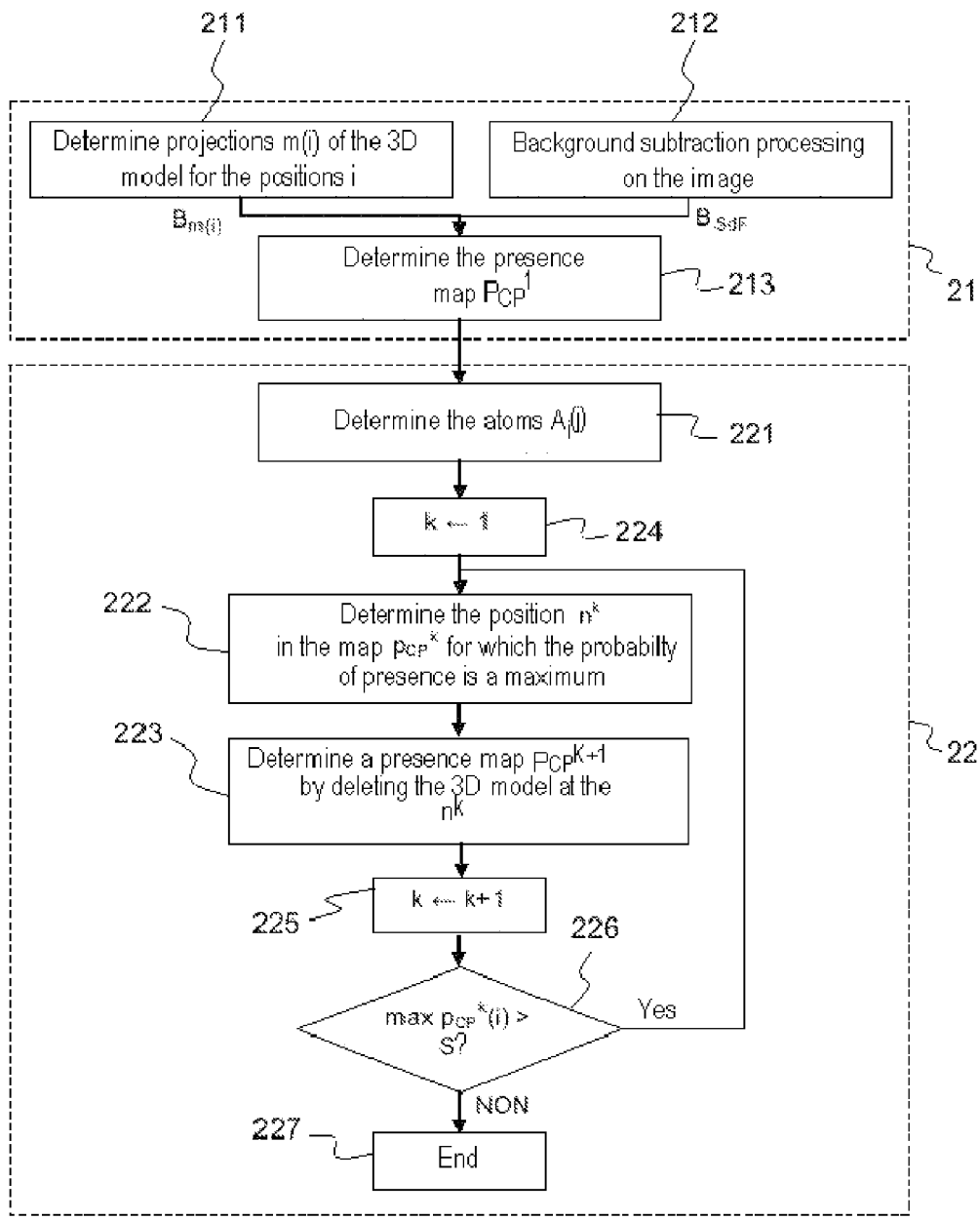
FIG. 2 represents, in logic diagram form, an example of steps implemented in the method for locating objects of interest according to the invention.

FIG. 2 represents, in logic diagram form, an example of steps implemented in the method for locating objects of interest according to the invention. For the subsequent description, the 3D model chosen to represent an object of interest at the position i in the scene is denoted M(i), and m(i) denotes its projection in an image space of the camera. In a first phase 21, the presence map $p_{CP}$ is determined. Phase 21 thus consists in determining, for each position i, the probability $p_{CP}(i)$ that an object of interest is situated at this position i considered. Phase 21 comprises for example the following steps. In a first step 211, the projection m(i) of the 3D model M(i) is determined individually for each position i. These projections are determined by the relation between the three-dimensional space of the scene and the image space of the camera, that is to say between the spatial coordinates of the scene and the pixels of the image. Images, called projection images $B_{m(i)}$, of dimensions equal to those of the image provided by the camera can be defined on the basis of the projections m(i). Each projection image $B_{m(i)}$ takes the value '1' inside the projected model m(i) and '0' outside. Denoting by M×N the dimensions of the image, with for example M the number of rows and N the number of columns of pixels, the projection images $B_{m(i)}$ can be modeled by the following relation:

$$B_{m(i)} \in \{0,1\}^{M \times N}$$

In a second step 212, a processing for locating objects is applied to the image provided by the camera and in which objects of interest are sought. This processing for locating objects produces an image of presence of objects of the same dimensions as the dimensions of the image provided by the camera. This entails for example a background subtraction processing. This processing consists in differentiating the pixels corresponding to the background, that is to say to the scene in the absence of objects, from the pixels corresponding to objects introduced into the scene. These objects may or may not be objects of interest. The image of presence of objects that is produced by the background subtraction processing is called the background subtraction image $B_{SdF}$. Each pixel of the image $B_{Sdf}$ takes for example the value '0' if it corresponds to the background, and the value '1' if it corresponds to an object. The image $B_{SdF}$ can thus be regarded as a binary mask. The image $B_{SdF}$ can be modeled by the following relation:

$$B_{SdF} \in \{0,1\}^{M \times N}$$

Steps 211 and 212 can be carried out in an arbitrary order. However, step 211 of determining the projection images is advantageously carried out prior to the other steps of the method. Indeed, for a camera positioned in a given scene, the projection images $B_{m(i)}$ depend only on the 3D model used. The maps can thus be determined beforehand for the various 3D models liable to be used in the location method. In a third step 213, the presence map $p_{CP}$ is determined on the basis of the image of presence of objects, for example the background subtraction image $B_{SdF}$, and of the projection images $B_{m(i)}$. For each position i of the presence map $p_{CP}$, the probability $p_{CP}(i)$ is for example determined as being the ratio of the number of pixels having at one and the same time the value '1' in the background subtraction image $B_{SdF}$ and the value '1' in the projection image $B_{m(i)}$ of the position i considered, to the number of pixels having the first value in said projection image $B_{m(i)}$:

$$p_{CP}(i) = \frac{|B_{m(i)} \cap B_{SdF}|}{|B_{m(i)}|}$$

where the operator |I| defines the number of pixels in the image I.

The background subtraction image $B_{SdF}$ determined during step 212 exhibits the drawback of bringing about a loss of information utilizable during the subsequent steps of the method according to the invention. Advantageously, the image $B_{SdF}$ can be replaced with a so-called distance image $D_{SdF}$ in which the pixels no longer necessarily take the value '0' or '1', but can take any value lying between '0' and '1', as a function of the probability that the pixels considered correspond to the background or to an object. The pixels take for example the value '0' if it is certain that they correspond to the background, the value '1' if it is certain that they correspond to an object, or an intermediate value as a function of the probability that they correspond to an object. The image $D_{SdF}$ can be modeled by the following relation:

$$D_{SdF} \in [0,1]^{M \times N}$$

The probabilities $p_{CP}(i)$ of the presence map can then be determined as being equal to the ratio of the sum of the values of the pixels of the distance image $D_{SdF}$ corresponding to the pixels having the value '1' in the projection image $B_{m(i)}$ of the position i considered, to the number of pixels having the value '1' in this projection image $B_{m(i)}$:

$$p_{CP}(i) = \frac{\sum_{(x,y)|B_{m(i)}(x,y)=1} D_{SdF}(x,y)}{|B_{m(i)}|}$$

where the pairs (x, y) designate the pixels in row x and in column y of the image considered.

Moreover, the presence map can be determined on the basis of several cameras observing the scene from different viewpoints. A set of cameras is denoted C. A presence map $p_{CP}^c$ is determined for each of the cameras c of the set C, as indicated previously. The presence maps can be determined on the basis of background subtraction images $B_{SdF}$ or of distance images $D_{SdF}$. The presence map $p_{CP}^c$ must take into consideration the fact that each position i of the map $p_{CP}^c$ is not necessarily visible to all the cameras. Thus, an operator $v^c(i)$ can be determined so as to indicate, for each position i, whether a 3D model M(i) does or does not project into the image of a camera c.

For each position i, a subset $\tilde{C}(i)$ of the set C is defined, comprising the cameras providing images in which the projections m(i) are correctly visible. The presence map $p_{CP}$ can then be determined on the basis of the set of presence maps $p_{CP}^c$. The probability $p_{CP}(i)$ of the global presence map at each position i is for example the geometric mean of the probabilities $p_{CP}^c(i)$:

$$p_{CP}(i) = \sqrt[|\tilde{C}(i)|]{\prod_{c \in \tilde{C}(i)} p_{CP}^c(i)}$$

The image of presence of objects can be determined other than by a background subtraction processing. In particular, it can be determined by a classification processing. The classification data associated with each position i must be converted into probabilities so as to be able to be utilized subsequently in the location method. The document "Gualdi Giovanni, A. Prati, R. Cucchiara. Multi-stage Sampling with Boosting Cascades for Pedestrian Detection in Images and Videos. In Proceedings of ECCV (6)'2010. pp. 196-209" provides an example of such a conversion.

According to a particularly advantageous embodiment, the presence map $p_{CP}$ is determined at each position i on the basis of several presence maps, for example the presence map $p_{CP}^{SdF}$ obtained by a background subtraction processing and the presence map $p_{CP}^{class}$ obtained by a classification processing. The various presence maps are for example combined by calculating, position by position, the product of the probabilities associated with each processing. The presence map $p_{CP}$ thus obtained is therefore less dependent on the processing applied, and therefore more reliable.

The presence map $p_{CP}$ provides a first estimation of the presence of objects of interest in the observed scene. This first estimation is obtained on the basis of a location criterion defined in the image space of the camera. The location criterion is for example a criterion associated with a background subtraction processing or a criterion associated with a classification processing. The main drawback is that the presence of an object of interest in the scene at a given position risks giving rise to the erroneous detection of objects of interest at each of the positions situated behind the actual position. Indeed, the presence of an object of interest at a given position can give rise to the occultation of all or some of other objects of interest. A second phase is therefore necessary in the method for locating objects of interest so as to take occultation phenomena into account and to determine the position or positions where the objects of interest are most likely situated. This phase is characterized notably in that the determination of the actual positions of the objects of interest is carried out in the three-dimensional space of the presence map.

Figure 3:
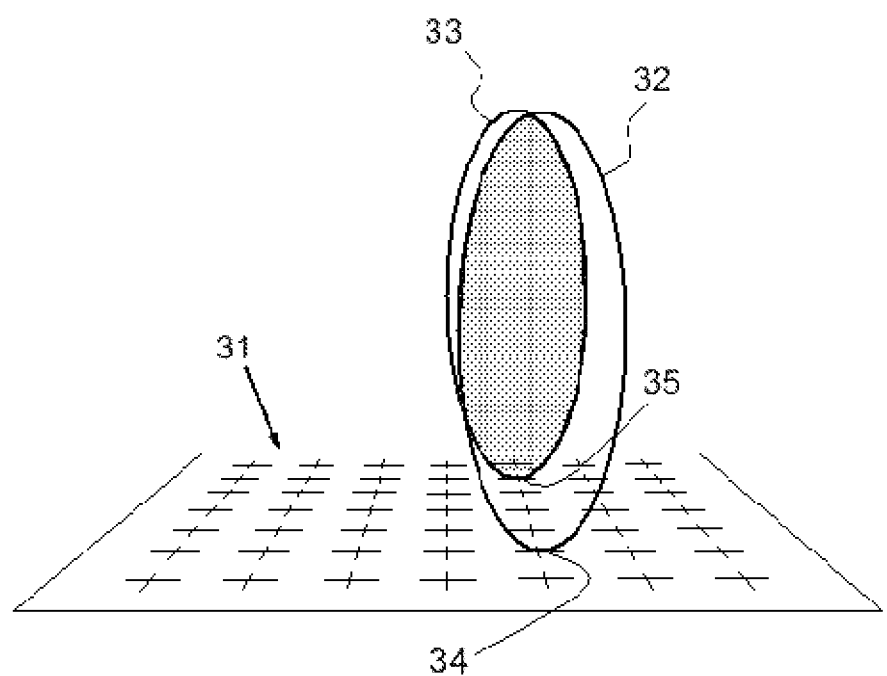
FIG. 3 illustrates the mutual masking of objects and the associated problem of locating the objects in the image space of a camera.

FIG. 3 illustrates the problem of the mutual masking of objects. A presence map 31 analogous to that of FIG. 1 and two 3D models 32 and 33 are represented according to a viewpoint of a camera, that is to say in the image space of the camera. The first 3D model 32 is located at a position 34 of the presence map 31, and the second 3D model 33 is positioned at a position 35. The 3D models 32 and 33 are ellipsoids. In the image reference frame of the camera, the 3D models 32 and 33 thus project in the form of ellipses. They are positioned in such a way in relation to the camera that their projections in the image reference frame amply overlap. The zone of overlap between the two ellipses is represented hatched. The objective of the second phase is therefore to delete from the presence map the contribution of a 3D model considered to be present at a given position in each of the other positions.

The second phase 22 comprises the following steps. In a first step 221, a 3D model representative of an object of interest is placed successively on each position i, and its influence on each of the other positions in the image space of the camera is determined. The influence of an object of interest at a given position i on each of the other positions, denoted j, of the presence map $p_{CP}$ is modeled by an entity called an "atom" $A_i$. The number of positions i or j in the presence map is denoted N, a 3D model representative of an object of interest placed at the position i is denoted M'(i), and its projection in the image space of the camera is denoted m'(i). The 3D model M'(i) can be identical to the 3D model M(i) used in the first phase 21. The projection m'(i) in the image space is in this case identical to the projection m(i). The atoms $A_i$ are advantageously modeled mathematically in the form of a vector for each position i, the value $A_i(j)$ of the component of a vector $A_i$ being representative of the influence of the presence of a 3D model M'(i) at the position i considered on the position j. The value $A_i(j)$ of an atom $A_i$ is for example determined by the following relation:

$$A_i(j) = \frac{|m'(i) \cap m'(j)|}{m'(j)}$$

This relation defines, for each pair of positions (i,j), the ratio of the number of pixels in common between two projections m'(i) and m'(j) of 3D models M'(i) and M'(j), to the number of pixels of the projection m'(i) of the 3D model M'(j). The relation is illustrated in FIG. 3 by the two ellipses and their zone of overlap. The first step 221 can be carried out prior to any other step of the method. Within the framework of a real-time processing on an image stream, step 221 may be carried out just once for the set of images, the atoms $A_i(j)$ being independent of the images. In a second step 222, the position n, in the presence map, at which an object of interest has the most chance of being situated is determined. It is then considered that an object of interest is situated at this position n. The position n can be determined by searching for the largest probability $p_{CP}(i)$ in the presence map $p_{CP}$. This therefore entails searching for the maximum probability in the presence map. The determination of the position n at which an object of interest has the most chance of being situated can comprise a prior step consisting in averaging the probabilities $p_{CP}(i)$ over a local neighborhood. This prior step makes it possible to smooth probabilities $p_{CP}(i)$ that are abnormally high at certain positions, for example on account of the background subtraction processing. The search for a position n can also form the subject of other prior steps aimed at refining the probabilities $p_{CP}(i)$ of the presence map $p_{CP}$. In a third step 223, a new presence map is determined by deleting from the initial presence map the contribution afforded by a 3D object in position n to each position i.

Steps 223 and 223 can be repeated so as to locate all the objects of interest in the scene. In FIG. 2, the repetition of steps 222 and 223 is performed by means of a counter of value k, the presence map being indexed by the value k ($p_{CP}^{k}$). In an initialization step 224, carried out subsequent to step 221 or, if appropriate, to step 213, the value k is set to the value '1'. The presence map determined during step 213 may therefore be written $p_{CP}^{1}$. The first iteration of step 222 is carried out subsequent to step 224 with the probability map $p_{CP}^{1}$. Step 223 is carried out subsequent to each iteration of step 222. For a given iteration k, the probabilities of the new presence map, denoted $p_{CP}^{k+1}$, are determined as a function of the presence map $p_{CP}^{k}$ and of the last position $n^k$ at which an object of interest has been considered to be present. Subsequent to each step 223, the value k of the counter is incremented by one unit in a step 225. For a given iteration k, step 223 can be modeled by the following relation:

$$\forall i \in N, \ p_{CP}^{k+1}(i) = p_{CP}^{k}(i) - A_{n^k}(i)$$

In practice, simple subtraction does not give good results. Indeed, an atom represents the influence of a 3D model, by definition theoretical, on other identical 3D models. This influence can be likened to a probability of presence. The influence is therefore perfect, whereas the presence map determined on the basis of image criteria is not perfect.

Consequently, the atom $A_{n^k}(i)$ must be weighted so as to take this phenomenon into account. The weight is determined so that the probability $p_{CP}^{k+1}(n^k)$ takes the value zero or almost-zero, the interaction between two models placed at the same position being total. The probabilities $p_{CP}^{k+1}(i)$ of the neighboring positions near the position $n^k$ decrease, while the probabilities of the more distant positions remain unchanged. More generally, step 223 consists in determining the probabilities $p_{CP}^{k+1}(i)$ of the new presence map, which are lower than the previous one, as a function of the interaction between a 3D model placed at the position $n^k$ and a 3D model placed successively on each position i of the presence map. A step 226 is carried out subsequent to step 225. It consists in determining whether objects of interest are still liable to be situated in the scene. For this purpose, the maximum probability ($\max_N p_{CP}^k(i)$) in the presence map considered is compared with a predetermined threshold S. This threshold S is for example equal to 0.5. If the maximum probability is greater than the threshold, steps 222, 223, 225 and 226 are repeated so as to determine the new position $n^k$ in the new presence map where an object of interest is most liable to be situated. If the maximum probability is less than the threshold, this signifies that all the objects of interest in the scene ought to have been located. The location method is therefore terminated in a step 227. Step 226 could, by way of alternative, be carried out by determining whether at least one of the probabilities ($p_{CP}^k(i)$) in the presence map considered is greater than the threshold S.

According to a particular embodiment, step 223 of determining the probabilities $p_{CP}^{k+1}(i)$ of the presence map $p_{CP}^{k+1}$ is carried out by a least squares minimization between the probabilities $p_{CP}^1(i)$ of the presence map of the initial iteration and a linear combination of the atoms $A_{n^k}$ corresponding to the positions $n^k$ where objects of interest are considered to be present at the current iteration k.

With respect to the procedures of the prior art, the method for locating objects according to the invention makes it possible to determine the positions of the objects of interest by operations carried out directly in the space of the presence map, without involving the image space. The atoms modeling the influences of the presence of objects of interest between the various positions can be determined previously. Thus, on the basis of an initial presence map, the location of objects of interest is carried out in a space of dimension equal to the number of positions in the presence map. Moreover, the location method according to the invention is a so-called constructive method, that is to say it starts from an initial configuration where no object of interest is present, the positions where an object is actually present being determined iteratively on the basis of the probability maxima in the various presence maps computed in the course of the algorithm. Correct positions are therefore determined in tandem with the iterations without subsequent dispute. Conversely, the procedures of the prior art are termed degressive, that is to say they start from a configuration where objects are considered to be present on all the possible positions of the presence map, rather unlikely positions being eliminated iteratively.

The invention claimed is:

1. A method for locating objects of interest in a scene observed by an image acquisition system, the objects of interest being located on a basis of an initial presence map $p_{cp}^1(i)$ modeling positions i in the scene and comprising, for each position i, a value $p_{cp}^1(i)$ representative of a probability that an object of interest is situated at the position i considered, each value $p_{cp}^1(i)$ being obtained on a basis of a location criterion defined in an image space of the image acquisition system, the method comprising an iteration of the following successive steps as long as at least one of the values $p_{cp}^k(i)$ of the presence map $p_{cp}^k$ considered for a current iteration k is greater than a predetermined threshold:

determining a position $n^k$ in the presence map $p_{cp}^k$ for which a value $p_{cp}^k(n_k)$ is a maximum, an object of interest being considered to be present at said position $n^k$, on a basis of atoms $A_j$ predetermined for each position j of the presence map $p_{cp}^k$, the atom $A_j$ of a position j comprising, for each position i, a value MO representative of overlap between projection m'(i) in the image space of a three-dimensional model M'(i) placed at the position i and projection m'(j) in the image space of a three-dimensional model M'(j) placed at the position j, each three-dimensional model being representative of an object of interest, determining a presence map $p_{cp}^{k+1}$ each value $p_{cp}^{k+1}(j)$ of which is equal to a corresponding value of the initial presence map $p_{cp}^1$ or of one of the presence maps determined during a previous iteration, decreased by a linear combination of values $A_{n^k}(j)$ of atoms $A_{n^k}$ corresponding to the positions $n^k$ where objects of interest are considered to be present.

2. The method as claimed in claim 1, in which each value $A_i(j)$ of an atom $A_i$ is determined as being a ratio of a number of common pixels shared by projections m'(i) and m'(j) to the number of pixels of projection m'$^{(j)}$.

3. The method as claimed in claim 1, in which determining the presence map $p_{cp}^{k+1}$ is carried out by a least squares minimization between, on one hand, the probabilities $p_{cp}^k(i)$ of the presence map of the current iteration k or probabilities $p_{cp}^1(i)$ of the initial presence map $p_{cp}^1$ and, on another hand, a linear combination of the atoms $A_{n^k}$ corresponding to the positions $n^k$ where objects of interest are considered to be present at the current iteration k.

4. The method as claimed in claim 1, in which the initial presence map $p_{cp}^1$ is determined by the following steps:

determining a projection image $B_{m(i)}$ for each position i of the initial presence map $p_{cp}^1$, each projection image $B_{m(i)}$ having dimensions equal to those of an image of the image acquisition system and corresponding to the projection m(i) in the image space of a three-dimensional model M(i) representative of an object of interest placed at the position i considered, each pixel of the projection image $B_{m(i)}$ taking a first value when it belongs to the projection m(i) and a second value otherwise, determining, by a processing for locating objects carried out on a basis of the image of the image acquisition system, an image of presence of objects having dimensions equal to those of the image of the image acquisition system, each pixel of the image of presence of objects taking a value as a function of its correspondence to an object present in the scene, determining the initial presence map $p_{cp}^1$ as a function of the projection images $B_{m(i)}$ and of the image of presence of objects.

5. The method as claimed in claim 4, in which the processing for locating objects is a background subtraction processing, each pixel of the image of presence of objects taking a first value when it corresponds to an object present in the scene and a second value otherwise.

6. The method as claimed in claim 5, in which determining the initial presence map $p_{cp}^1$ comprises a step consisting in determining each value $p_{cp}^1(i)$ as being equal to a ratio of a number of pixels having at one and the same time the first value in the image of presence of objects and the first value in the projection image $B_{m(i)}$ of the position i considered, to a number of pixels having the first value in said projection image $B_{m(i)}$.

7. The method as claimed in claim 4, in which the processing for locating objects is a background subtraction processing, each pixel of the image of presence of objects taking a value as a function of a probability that it corresponds to an object present in the scene.

8. The method as claimed in claim 7, in which determining the initial presence map $p^1_{cp}$ comprises a step consisting in determining each value $p^1_{cp}(i)$ as being equal to a ratio of a sum of the values of the pixels of the image of presence of objects corresponding to the pixels having the first value in the projection image $B_{m(i)}$ of the position i considered, to a number of pixels having the first value in said projection image $B_{m(i)}$.

9. The method as claimed in claim 1, in which the scene is observed by several image acquisition systems, the initial presence map $p^1_{cp}$ being determined on a basis of several initial presence maps $p^c_{cp}$, each value $p^c_{cp}(i)$ of an initial presence map $p^c_{cp}$ being obtained on a basis of a location criterion defined in an image space of the image acquisition system considered, each value $p^1_{cp}(i)$ being equal to a mean of a set of values $p^c_{cp}(i)$ of the position i considered.

* * * * *